US009086682B2

(12) United States Patent
Choe et al.

(10) Patent No.: US 9,086,682 B2
(45) Date of Patent: Jul. 21, 2015

(54) DIGITAL HOLOGRAM IMAGE REPRODUCING DEVICE AND SYNCHRONIZATION CONTROL METHOD THEREOF

(75) Inventors: Wooyoung Choe, Paju-si (KR); Seungho Baek, Paju-si (KR); Juseong Park, Goyang-si (KR); Jooah Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 602 days.

(21) Appl. No.: 13/478,740

(22) Filed: May 23, 2012

(65) Prior Publication Data

US 2013/0100181 A1 Apr. 25, 2013

(30) Foreign Application Priority Data

Oct. 20, 2011 (KR) .......................... 10-2011-0107340

(51) Int. Cl.
*G03H 1/22* (2006.01)
*G09G 3/00* (2006.01)
*G09G 3/36* (2006.01)

(52) U.S. Cl.
CPC ............. *G03H 1/2294* (2013.01); *G09G 3/003* (2013.01); *G09G 3/3614* (2013.01); *G09G 3/3666* (2013.01); *G03H 2225/22* (2013.01); *G09G 2300/026* (2013.01); *G09G 2310/0283* (2013.01); *G09G 2310/06* (2013.01)

(58) Field of Classification Search
CPC ... G09G 3/3666; G09G 3/003; G09G 3/3614; G09G 2310/06; G09G 2310/0283; G09G 2300/026; G03H 1/2294; G03H 2225/22
See application file for complete search history.

(56) References Cited

U.S. PATENT DOCUMENTS

| 4,484,219 A * | 11/1984 | Kirk ................................ 348/40 |
| 8,269,706 B2 * | 9/2012 | Hwang .......................... 345/94 |
| 2012/0146967 A1 * | 6/2012 | Kim et al. ...................... 345/204 |

FOREIGN PATENT DOCUMENTS

| JP | 3375944 B2 | 2/2003 |
| KR | 20110066513 A | 6/2011 |
| KR | 20110095719 A | 8/2011 |

* cited by examiner

*Primary Examiner* — Liliana Cerullo
(74) *Attorney, Agent, or Firm* — Brinks Gilson & Lione

(57) ABSTRACT

A digital hologram image reproducing device includes a light modulator reproducing a hologram interference fringe image, a first panel driving circuit which scans a first display panel and writes data of the hologram interference fringe image to the first display panel, a first timing controller controlling an operation timing of the first panel driving circuit, a second panel driving circuit which scans a second display panel and writes data of the hologram interference fringe image to the second display panel, a second timing controller controlling an operation timing of the second panel driving circuit, and a panel synchronization circuit which simultaneously transfers a polarity control signal received from one of the first and second timing controllers to the first and second panel driving circuits.

17 Claims, 10 Drawing Sheets

FIG. 2

PNL1        PNL2

PNL1        PNL2

```
+ + + +  · · ·  + + + +        + + + +  · · ·  + + + +
− − − −  · · ·  − − − −        − − − −  · · ·  − − − −
+ + + +  · · ·  + + + +        + + + +  · · ·  + + + +
− − − −  · · ·  − − − −        − − − −  · · ·  − − − −
              ⋮                              ⋮
+ + + +  · · ·  + + + +        + + + +  · · ·  + + + +
− − − −  · · ·  − − − −        − − − −  · · ·  − − − −
+ + + +  · · ·  + + + +        + + + +  · · ·  + + + +
− − − −  · · ·  − − − −        − − − −  · · ·  − − − −
```

DIGITAL HOLOGRAM IMAGE REPRODUCING DEVICE AND SYNCHRONIZATION CONTROL METHOD THEREOF

This application claims the priority and the benefit under 35 U.S.C. §119(a) on Patent Application No. 10-2011-0107340 filed in Republic of Korea on Oct. 20, 2011, the entire contents of which are hereby incorporated by reference.

BACKGROUND

1. Field of the Invention

Embodiments of the disclosure relate to a digital hologram image reproducing device capable of reproducing a three-dimensional (3D) image using a digital hologram image and a synchronization control method of the digital hologram image reproducing device.

2. Discussion of the Related Art

Recently, studies on three-dimensional (3D) images and image reproduction technologies are being actively carried out. 3D image media are real image media of new concept providing high-level visual informations and thus is expected to lead to the next generation image display devices. The existing two-dimensional (2D) imaging systems provide a plane image. On the other hand, 3D imaging systems may be referred to as an ultimate image display technology because they show real image information of an object to observers.

As methods for reproducing the 3D image, a stereoscopy method, a holography method, an integral imaging method, etc. have been studied and developed. Out of the methods, the holography method reproduces the 3D image through a hologram image reproduced using a laser and thus can implement the 3D images without glasses.

The holography method records an interference signal obtained by the superposition of light (i.e., object wave) reflected from an object and light (i.e., reference wave) having the interference and reproduces the interference signal. The object wave, which is scatted by hitting on an object using a laser beam with high coherence, meets the reference wave incident in a direction different from the object wave, thereby forming interference fringes. The recording of the interference fringes on a photographic film is called a hologram. The interference fringes are formed by the interference generated when the object wave meets the reference wave, and amplitude information and phase information of the object are recorded on the interference fringes. The interference fringes include intensity information and phase information of the light waves. The intensity information is recorded as a contrast between interference fringe patterns of the interference fringes, and the phase information is recorded as a distance between the interference fringe patterns. The holography method irradiates a reference beam onto the interference fringes and reproduces the interference fringes recorded on the hologram as the 3D image.

Computer generated hologram (CGH) for storing, transmitting, and image processing a hologram pattern using a computer was developed using various methods. Systems for displaying a computer generated hologram of a motion image as well as a still image have been developed.

The computer generated hologram system may calculate the interference fringes using the computer and may produce a hologram interference fringe image. The computer generated hologram system transmits data of the hologram interference fringe image to a spatial light modulator (SLM). When the reference beam is irradiated onto the SLM, hologram interference fringe patterns displayed on the SLM are reproduced as the 3D image. The SLM may be implemented as a liquid crystal display panel. A pixel size of a SLM panel has to decrease and a screen size of the SLM panel has to increase, so as to improve the quality of the 3D image. However, because a reduction in the pixel size has a technological limit, a plurality of liquid crystal display panels may be attached to one another on the same plane and may be individually driven, so as to increase the screen size.

When the liquid crystal display panels are attached to one another on the same plane, polarities of data voltages supplied to the same line of the individually driven liquid crystal display panels may not be synchronized. Namely, the polarities of the data voltages on the same line of the liquid crystal display panels may be different from one another. When the polarities of the data voltages on the same line of the liquid crystal display panels are reversed, the computer generated hologram system adversely affects the quality of the 3D image. For example, a 3D hologram reproduction image may be reversed up and down.

BRIEF SUMMARY

In one aspect, a digital hologram image reproducing device includes a light modulator including a plurality of display panels attached to one another on the same plane, the light modulator reproducing a hologram interference fringe image, a first panel driving circuit configured to scan a first display panel and write data of the hologram interference fringe image to the first display panel, a first timing controller configured to control an operation timing of the first panel driving circuit, a second panel driving circuit configured to scan a second display panel and write data of the hologram interference fringe image to the second display panel, a second timing controller configured to control an operation timing of the second panel driving circuit, and a panel synchronization circuit configured to simultaneously transfer a polarity control signal received from one of the first and second timing controllers to the first and second panel driving circuits.

In another aspect, a synchronization control method of a digital hologram image reproducing device includes a light modulator which includes a plurality of display panels attached to one another on the same plane and reproduces a hologram interference fringe image, a first panel driving circuit which scans a first display panel and writes data of the hologram interference fringe image to the first display panel, a first timing controller which controls an operation timing of the first panel driving circuit, a second panel driving circuit which scans a second display panel and writes data of the hologram interference fringe image to the second display panel, and a second timing controller which controls an operation timing of the second panel driving circuit, the synchronization control method including generating a first polarity control signal from the first timing controller, generating a second polarity control signal from the second timing controller, and simultaneously transferring one of the first and second polarity control signals to the first and second panel driving circuits.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 illustrates an example where polarities of data voltages written to the same line of spatial light modulator (SLM) panels are not synchronized;

FIG. 3 illustrates an example where polarities of data voltages written to the same line of SLM panels are synchronized;

DETAILED DESCRIPTION OF THE DRAWINGS AND THE PRESENTLY PREFERRED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
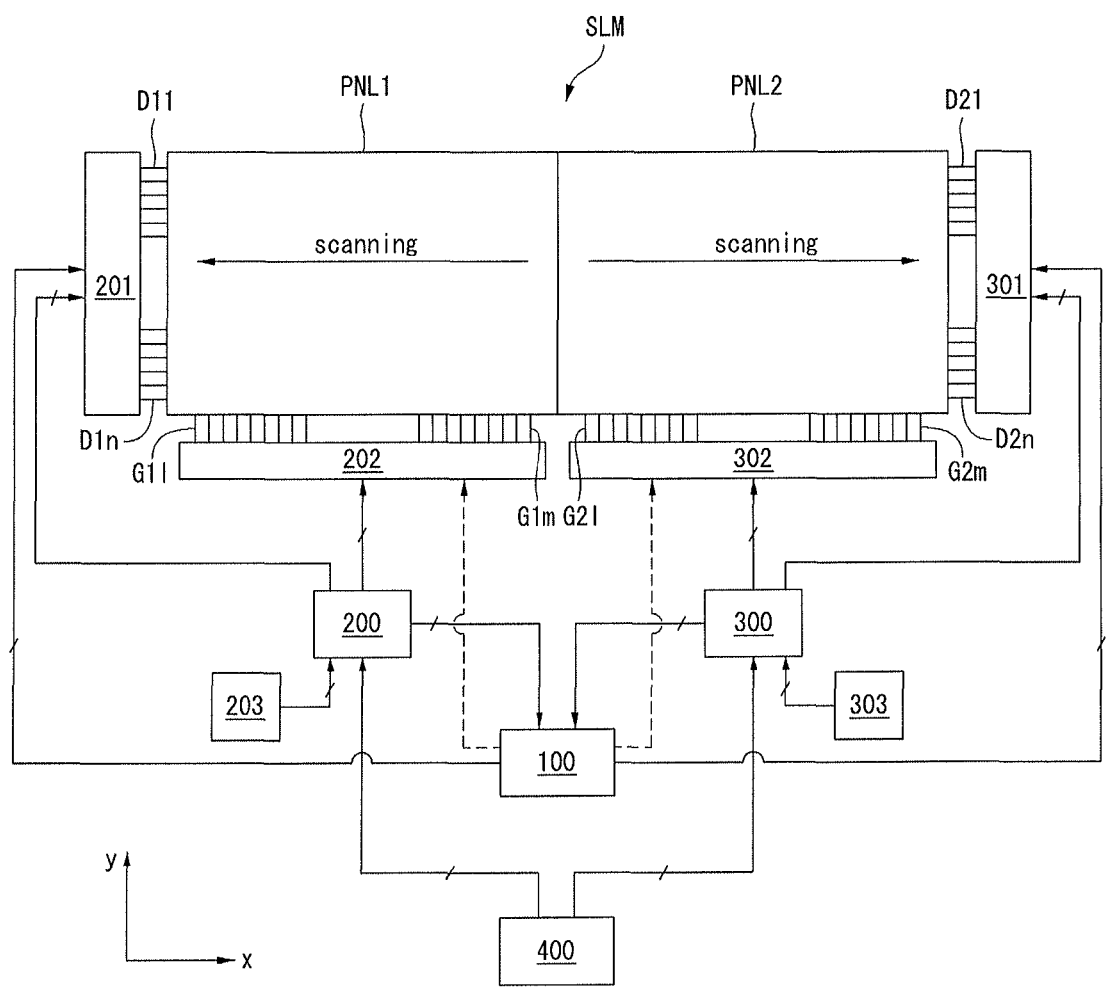
FIG. 1 is a block diagram of a digital hologram image reproducing device according to an example embodiment of the invention.

As shown in FIG. 1, a digital hologram image reproducing device according to an example embodiment of the invention includes a plurality of spatial light modulator (SLM) panels PNL1 and PNL2, a panel driving circuit for writing data of hologram interference fringes to the SLM panels PNL1 and PNL2, a plurality of timing controllers 200 and 300, and a panel synchronization circuit 100.

Figure 7:
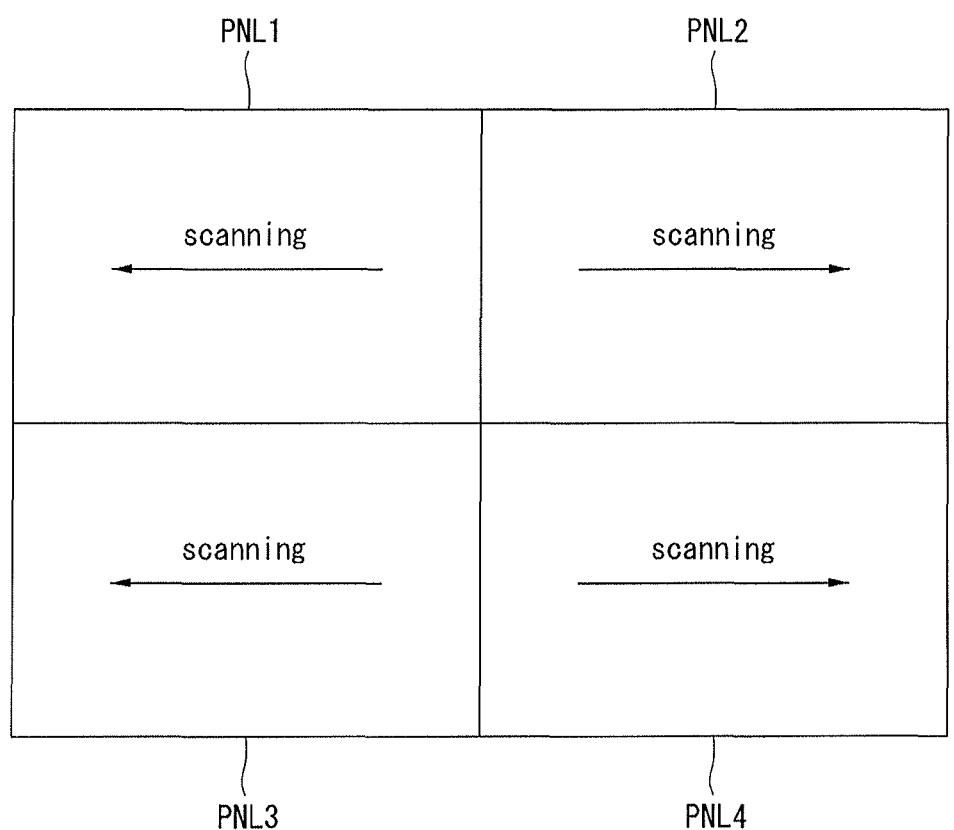
Figure 8:
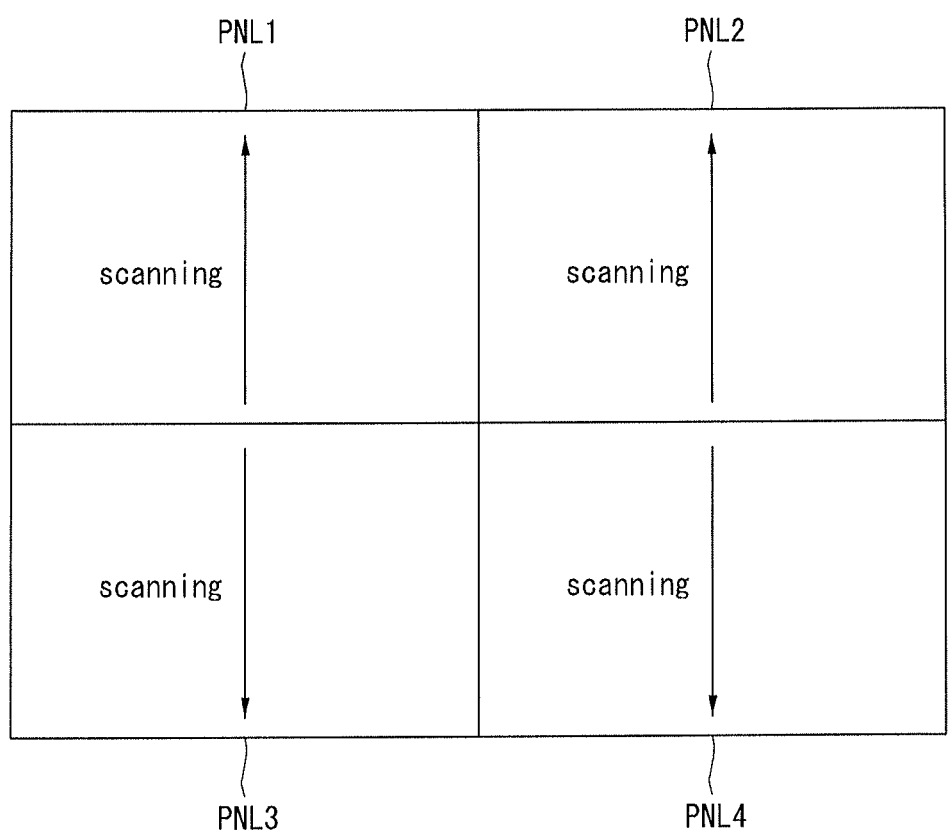

FIG. 1 shows that the SLM is implemented as the two SLM panels PNL1 and PNL2. The embodiment of the invention is not limited thereto. For example, as shown in FIGS. 7 and 8, the SLM may be implemented as a multi-panel configured by attaching four SLM panels PNL1 to PNL4 to one another. In other words, the SLM may be implemented as a multi-panel including N SLM panels, where N is a positive integer equal to or greater than 2.

Each of the SLM panels PNL1 and PNL2 may be implemented as a liquid crystal display panel including a liquid crystal layer between two substrates. The first SLM panel PNL1 includes data lines D11 to D1n to which a data voltage is supplied, gate lines G11 to G1m which cross the data lines D11 to D1n and receive a gate pulse (or a scan pulse), and pixels arranged in a matrix form defined by a crossing structure of the data lines D11 to D1n and the gate lines G11 to G1m, where n and m are a positive integer. The second SLM panel PNL2 includes data lines D21 to D2n to which a data voltage is supplied, gate lines G21 to G2m which cross the data lines D21 to D2n and receive a gate pulse (or a scan pulse), and pixels arranged in a matrix form defined by a crossing structure of the data lines D21 to D2n and the gate lines G21 to G2m. The data lines D11 to D1n and D21 to D2n are formed along an X-axis direction, and the gate lines G11 to G1m and G21 to G2m are formed along a Y-axis direction vertical to the X-axis direction.

The panel driving circuit includes a first panel driving circuit for writing data of hologram interference fringes to the first SLM panel PNL1 and a second panel driving circuit for writing data of hologram interference fringes to the second SLM panel PNL2. The first panel driving circuit includes a first data driving circuit 201 and a first gate driving circuit 202. The second panel driving circuit includes a second data driving circuit 301 and a second gate driving circuit 302.

The first data driving circuit 201 converts digital data (i.e., the data of the hologram interference fringes) received from the first timing controller 200 into positive and negative analog gamma compensation voltages and generates the data voltage. The first data driving circuit 201 supplies the data voltage to the data lines D11 to D1n. The first data driving circuit 201 inverts a polarity of the data voltage in response to a polarity control signal POL1' (refer to FIG. 4) received from the panel synchronization circuit 100. The first gate driving circuit 202 sequentially supplies the gate pulse to the gate lines G11 to G1m under the control of the first timing controller 200 or the panel synchronization circuit 100, so that the gate pulse is synchronized with the data voltage supplied to the data lines D11 to D1n. The gate pulse is shifted from one edge of the first SLM panel PNL1 close to a boundary between the SLM panels PNL1 and PNL2 to the other edge of the first SLM panel PNL1. An effect of the scanning direction will be described later.

The second data driving circuit 301 converts digital data (i.e., the data of the hologram interference fringes) received from the second timing controller 300 into positive and negative analog gamma compensation voltages and generates the data voltages. The second data driving circuit 301 supplies the data voltages to the data lines D21 to D2n. The second data driving circuit 301 inverts a polarity of the data voltage in response to a polarity control signal POL2' (refer to FIG. 4) received from the panel synchronization circuit 100. The second gate driving circuit 302 sequentially supplies the gate pulses to the gate lines G21 to G2m under the control of the second timing controller 300 or the panel synchronization circuit 100, so that the gate pulses are synchronized with the data voltages supplied to the data lines D21 to D2n. The gate pulse is shifted from one edge of the second SLM panel PNL2 close to the boundary between the SLM panels PNL1 and PNL2 to the other edge of the second SLM panel PNL2. An effect of the scanning direction will be described later.

The timing controllers 200 and 300 include the first timing controller 200 for controlling operation timing of the first panel driving circuit and the second timing controller 300 for controlling operation timing of the second panel driving circuit.

The first timing controller 200 is connected to the first data driving circuit 201 and the first gate driving circuit 202. The first timing controller 200 transmits the digital data to the first data driving circuit 201 and controls operation timings of the first data driving circuit 201 and the first gate driving circuit 202. More specifically, the first timing controller 200 transmits digital data of a hologram interference fringe image received from a host system 400 to the first data driving circuit 201 through a data interface. The data interface may be a mini low voltage differential signaling (LVDS) interface. The first timing controller 200 receives timing signals, such as a vertical sync signal Vsync, a horizontal sync signal Hsync, a data enable DE, and a main clock CLK, from the host system 400. The first timing controller 200 counts the timing signals received from the host system 400 and generates first timing control signals for controlling the operation timings of the first data driving circuit 201 and the first gate driving circuit 202. Waveform informations of the first timing control signals are stored in a first electrically erasable programmable read-only memory (EEPROM) 203.

The first timing control signals include a first gate timing control signal for controlling the operation timing of the first gate driving circuit 202 and a first data timing control signal for controlling the operation timing of the first data driving circuit 201 and the polarity of the data voltage. The first gate timing control signal includes a first gate start pulse GSP, a first gate shift clock GSC, a first gate output enable GOE, a first shift direction signal DIR, etc. The first gate start pulse GSP is generated once at a start time point of each frame period and controls a first output timing of the first gate driving circuit 202. The first gate shift clock GSC is a clock defining a shift timing of the first gate start pulse GSP. The first gate output enable GOE controls a width and an output timing of each of the gate pulses output from the first gate driving circuit 202. The first shift direction signal DIR controls a shift direction of the gate pulse of the first gate driving circuit 202 in a forward direction or a reverse direction.

The first data timing control signal includes a first source start pulse SSP, a first source sampling clock SSC, a first polarity control signal POL1, and a first source output enable SOE, etc. The first source start pulse SSP controls a data sampling start timing of the first data driving circuit 201. The first source sampling clock SSC is a clock defining a data sampling shift timing. The first polarity control signal POL1 controls a polarity of the data voltage output from the first data driving circuit 201 and an invert timing of the polarity of the data voltage. The first source output enable SOE controls an output timing of the data voltage of the first data driving circuit 201 and a charge share timing.

The second timing controller 300 is connected to the second data driving circuit 301 and the second gate driving circuit 302. The second timing controller 300 transmits the digital data to the second data driving circuit 301 and controls operation timings of the second data driving circuit 301 and the second gate driving circuit 302. More specifically, the second timing controller 300 transmits the digital data of the hologram interference fringe image received from the host system 400 to the second data driving circuit 301 through the data interface. The data interface may be the mini LVDS interface. The second timing controller 300 receives the timing signals, such as the vertical sync signal Vsync, the horizontal sync signal Hsync, the data enable DE, and the main clock CLK, from the host system 400. The second timing controller 300 counts the timing signals received from the host system 400 and generates second timing control signals for controlling the operation timings of the second data driving circuit 301 and the second gate driving circuit 302. Waveform informations of the second timing control signals are stored in a second EEPROM 303.

The second timing control signals include a second gate timing control signal for controlling the operation timing of the second gate driving circuit 302 and a second data timing control signal for controlling the operation timing of the second data driving circuit 301 and the polarity of the data voltage. The second gate timing control, signal includes a second gate start pulse GSP, a second gate shift clock GSC, a second gate output enable GOE, a second shift direction signal DIR, etc. The second gate start pulse GSP is generated once at a start time point of each frame period and controls a first output timing of the second gate driving circuit 302. The second gate shift clock GSC is a clock defining a shift timing of the second gate start pulse GSP. The second gate output enable GOE controls a width and an output timing of each of the gate pulses output from the second gate driving circuit 302. The second shift direction signal DIR controls a shift direction of the gate pulse of the second gate driving circuit 302 in a forward direction or a reverse direction.

The second data timing control signal includes a second source start pulse SSP, a second source sampling clock SSC, a second polarity control signal POL2, and a second source output enable SOE, etc. The second source start pulse SSP controls a data sampling start timing of the second data driving circuit 301. The second source sampling clock SSC is a clock defining a data sampling shift timing. The second polarity control signal POL2 controls a polarity of the data voltage output from the second data driving circuit 301 and an invert timing of the polarity of the data voltage. The second source output enable SOE controls an output timing of the data voltage of the second data driving circuit 301 and a charge share timing.

If the data interfaces between the timing controllers 200 and 300 and the data driving circuits 201 and 301 are the mini LVDS interfaces, the source start pulse SSP and the source sampling clock SSC may be omitted.

Figures 2, 3:
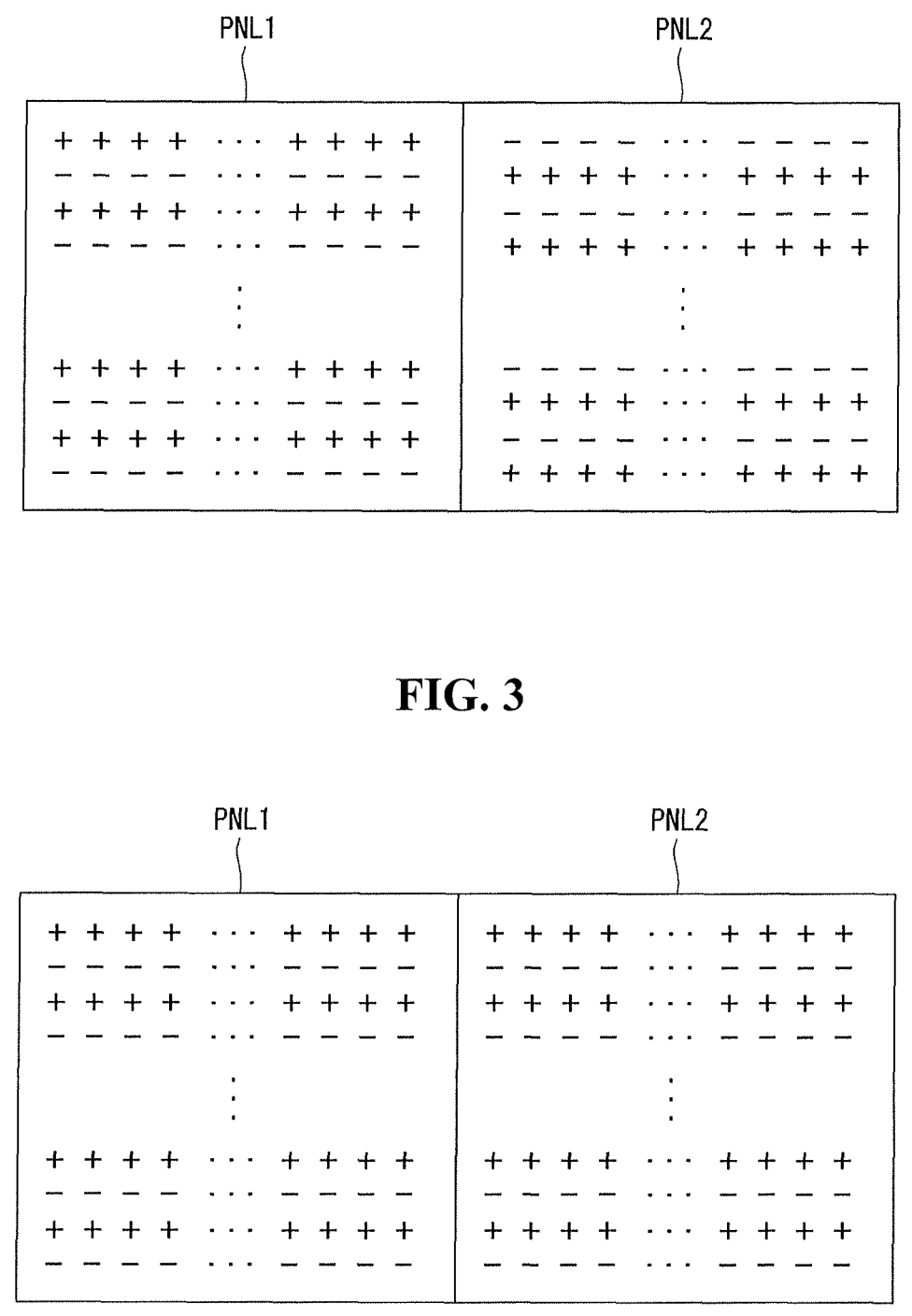

Even if the timing controllers 200 and 300 simultaneously receive the timing signals from the host system 400, the timing control signals output from the timing controllers 200 and 300 may not be synchronized with each other because of a deviation between delay times of the timing controllers 200 and 300. For example, a phase difference between the first and second polarity control signals POL1 and POL2 may be generated because of the deviation between the delay times of the timing controllers 200 and 300. As a result, when the first polarity control signal POL1 is at a high logic level, the second polarity control signal POL2 may be at a low logic level. In this instance, polarities of the data voltages written to the same line of the first and second SLM panels PNL1 and PNL2 are different from each other. For example, as shown in FIG. 2, when the polarities of the data voltages written to the first line of the first SLM panel PNL1 are positive polarities and the polarities of the data voltages written to the first line of the second SLM panel PNL2 are negative polarities, phase informations of reproduced hologram interference fringes are distorted.

To solve the asynchronous problem between the first and second SLM panels PNL1 and PNL2, the embodiment of the invention may set any one of the first and second timing controllers 200 and 300 as a master element and set the other controller as a slave element through $I^2C$ communication between the first and second timing controllers 200 and 300 and the panel synchronization circuit 100. The timing controller 200 or 300 (hereinafter, referred to as "master timing controller") serving as the master element generates the polarity control signal POL1 or POL2 and transfers the polarity control signal POL1 or POL2 to the panel synchronization circuit 100. On the other hand, the timing controller 300 or 200 (hereinafter, referred to as "slave timing controller") serving as the slave element do not output the polarity control signal POL2 or POL1. The master timing controller 200 or 300 generates the data timing control signals and the gate timing control signals and transfers the data timing control signals and the gate timing control signals to the panel synchronization circuit 100. On the other hand, the slave timing controller 300 or 200 may not generate the data timing control signals and/or the gate timing control signals. Thus, the master timing controller 200 or 300 has to include a circuit generating the timing control signals, but the slave timing controller 300 and 200 may omit at least a portion of a circuit generating the timing control signals.

The panel synchronization circuit 100 simultaneously controls the polarities of the data voltages of all of the SLM panels PNL1 and PNL2 based on the polarity control signal POL1 or POL2 received from the master timing controller 200 or 300. Thus, even if the polarity control signals POL1 and POL2 generated by the timing controllers 200 and 300 are not synchronized with each other, the panel synchronization circuit 100 may control the polarities of the data voltages of the SLM panels PNL1 and PNL2 based on one of the polarity control signals POL1 and POL2. Therefore, as shown in FIG. 3, the polarities of the data voltages written to the same line of the SLM panels PNL1 and PNL2 may be synchronized with each other. The panel synchronization circuit 100 may be implemented as a complex programmable logic device (CPLD) or a field-programmable gate array (FPGA).

The host system 400 may be various information equipments or household appliances such as a navigation system, a set-top box, a DVD player, a Blu-ray player, a computer, a home theater system, a broadcasting receiver, and a phone system. The host system 400 includes a system-on-chip (SoC) including a scaler and converts the digital data of the hologram interference fringe image from a video source into a format suitable to display on the SLM panel. The host system 400 transmits the digital data of the hologram interference fringe image and the timing control signals synchronized with the digital data of the hologram interference fringe image to the timing controllers 200 and 300 through an interface such as a low voltage differential signaling (LVDS) interface and a transition minimized differential signaling (TMDS) interface.

Figure 4:
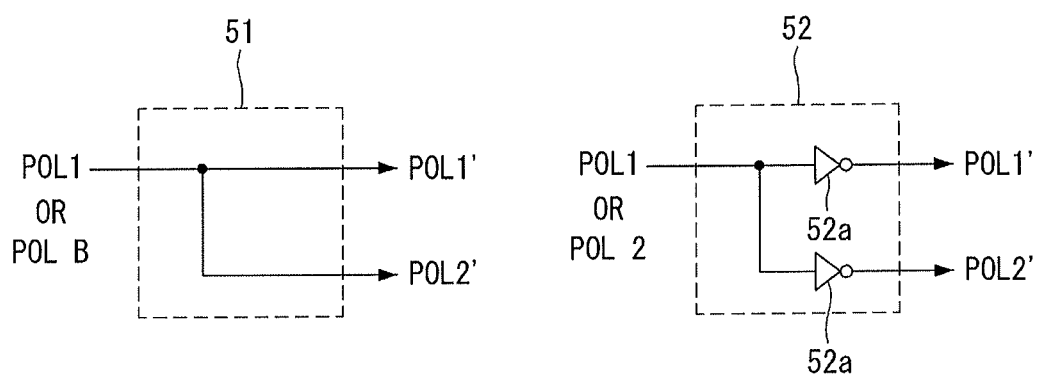
FIG. 4 illustrates a portion of a panel synchronization circuit for synchronizing polarity control signals.

FIG. 4 illustrates a portion of the panel synchronization circuit 100 for synchronizing the polarity control signal POL1 or POL2.

As shown in FIG. 4, the panel synchronization circuit 100 may receive one of the first and second polarity control signals POL1 and POL2 and may transfer the received polarity control signal POL1 or POL2 to the first and second data driving circuits 201 and 301 through parallel lines 51 and 52. A phase of each of the polarity control signals POL1' and POL2' supplied to the first and second data driving circuits 201 and 301 may be inverted by inverters 52a connected to the parallel lines 51 and 52.

Figure 5A:
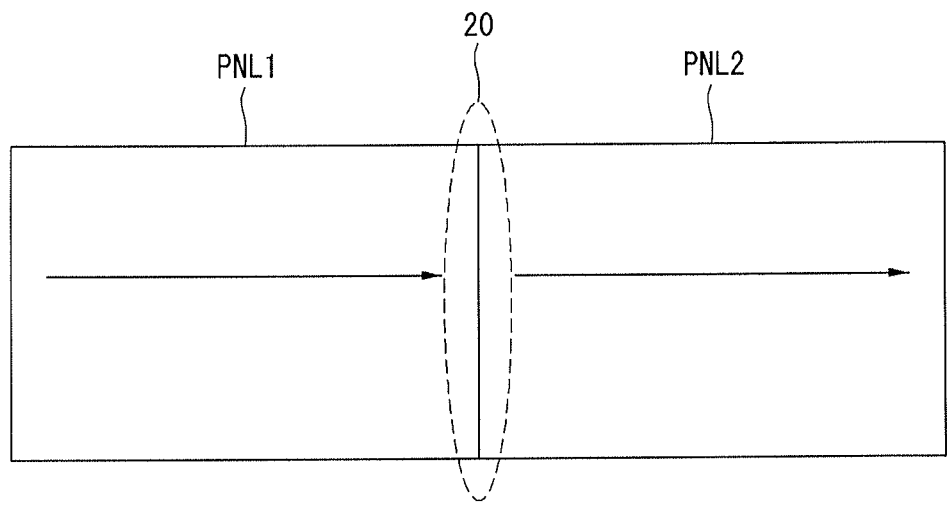
FIGS. 5A and 5B illustrate an example where scanning directions of SLM panels are the same.
Figure 5B:
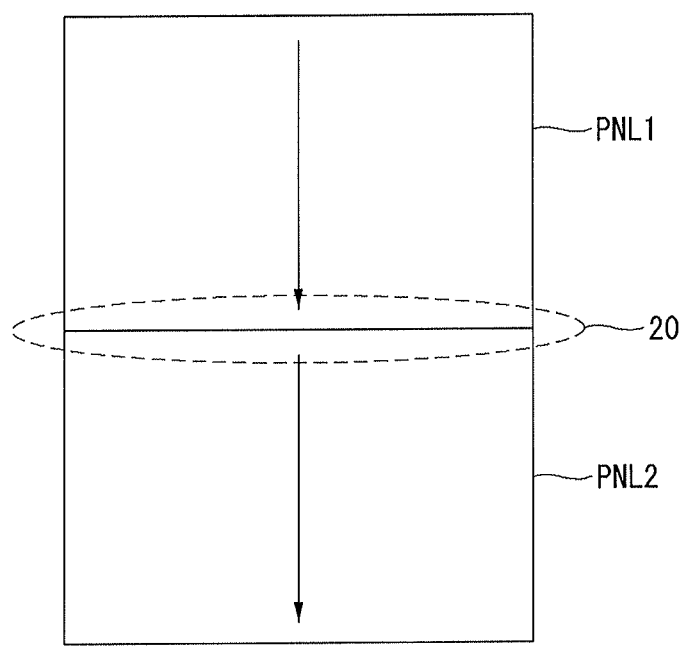
Figure 6:
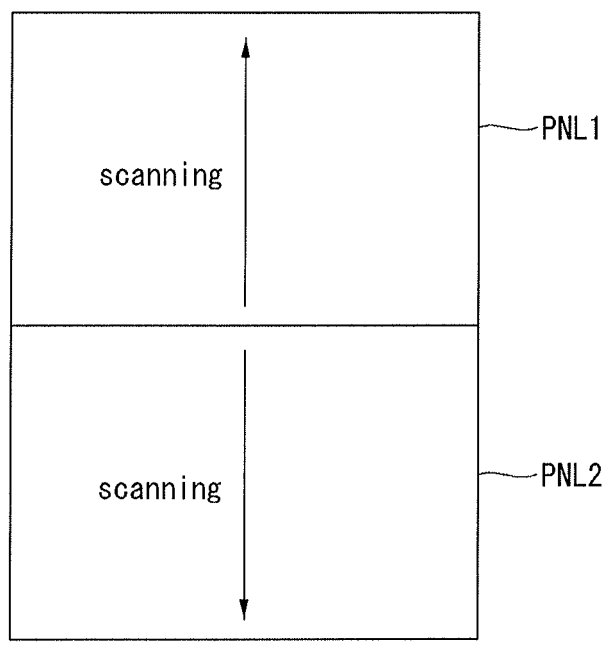
FIGS. 6 to 8 illustrate an example where scanning directions of SLM panels are different from each other.

When the scanning directions of the SLM panels PNL1 and PNL2 are same (i.e., when shift directions of the gate pulses of the SLM panels PNL1 and PNL2 are the same), important informations of the hologram interference fringes may be distorted. For example, as shown in FIGS. 5A and 5B, the two SLM panels PNL1 and PNL2 are positioned left and right or up and down and are attached to each other on the same plane in a horizontal direction or a vertical direction. In this instance, if the SLM panels PNL1 and PNL2 are scanned in the same direction, pixels positioned at a boundary 20 between the SLM panels PNL1 and PNL2 may be scanned later than other pixels in one of the SLM panels PNL1 and PNL2. Namely, the response delay time is insufficient for the later scanned pixels. Because the pixels existing at the boundary 20 between the SLM panels PNL1 and PNL2 are later scanned, the pixels existing at the boundary 20 between the SLM panels PNL1 and PNL2 cannot properly reproduce the hologram interference fringes. Further, important informations of a three-dimensional (3D) image are concentrated in a middle portion of a hologram interference fringe pattern. As a result, when the scanning directions of the SLM panels PNL1 and PNL2 are the same as shown in FIGS. 5A and 5B, most of informations of the reproduced 3D image may be omitted or distorted because of the distortion of an image of the middle portion of the hologram interference fringe pattern.

To solve the distortion problem of the image of the middle portion of the hologram interference fringe pattern, as shown in FIGS. 1 and 6 to 8, the embodiment of the invention causes the scanning directions of the SLM panels PNL1 and PNL2 to be the opposite directions and also starts a scanning operation from pixels positioned around the boundary between the SLM panels PNL1 and PNL2. For this, the embodiment of the invention synchronizes the gate timing control signals for controlling the operation timings of the gate driving circuits 202 and 302 and inverts the first and second shift direction signals DIR for controlling the shift directions of the gate pulses.

In an example illustrated in FIG. 7, the gate pulse of the first SLM panel PNL1 is shifted in the reverse direction, and the gate pulse of the second SLM panel PNL2 is shifted in the forward direction. In this instance, the first gate driving circuit 202 sequentially supplies the gate pulse to the gate lines G11 to G1$m$ in reverse order (i.e., from the mth gate line G1$m$ to the first gate line G11) in each frame period (refer to FIG. 1). On the other hand, the second gate driving circuit 302 sequentially supplies the gate pulse to the gate lines G21 to G2$m$ in forward order (i.e., from the first gate line G21 to the mth gate line G2$m$) in each frame period (refer to FIG. 1). For this, the first shift direction signal DIR is generated at the high logic level, and the second shift direction signal DIR is generated at the low logic level. Thus, the first and second shift direction signals DIR for controlling the scanning directions of the SLM panels PNL1 and PNL2 have to have opposite logic levels so that the scanning directions of the SLM panels PNL1 and PNL2 are different from each other.

Figure 9:
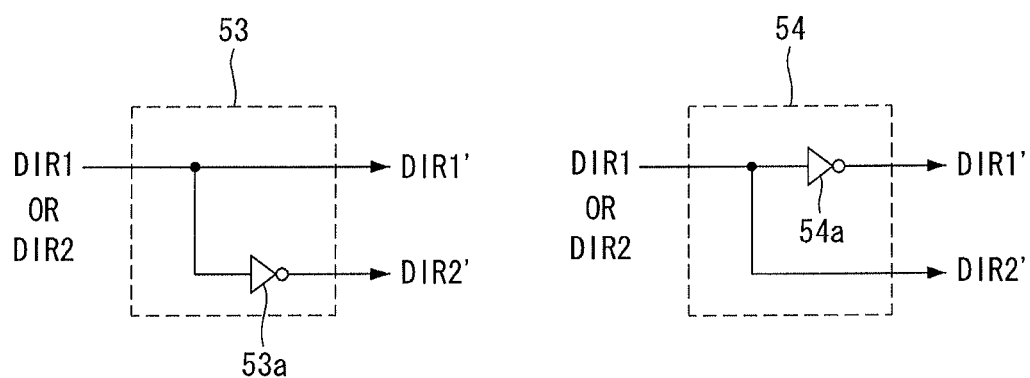
FIG. 9 illustrates a portion of a panel synchronization circuit for synchronizing shift direction signals.

FIG. 9 illustrates a portion of the panel synchronization circuit 100 for synchronizing the shift direction signals DIR.

As shown in FIG. 9, the panel synchronization circuit 100 may receive one of the first and second shift direction signals DIR1 and DIR2 and may transfer the received shift direction signal DIR1 or DIR2 to the first and second gate driving circuits 202 and 302 through parallel lines 53 and 54. The panel synchronization circuit 100 may synchronize the first and second shift direction signals DIR1' and DIR2' input to the first and second gate driving circuits 202 and 302. An inverter 53a or 54a may be connected to one of the parallel lines 53 and 54, to which the first and second shift direction signals DIR1' and DIR2' are supplied, so that the first and second shift direction signals DIR1' and DIR2' have opposite logic levels.

Figure 10:
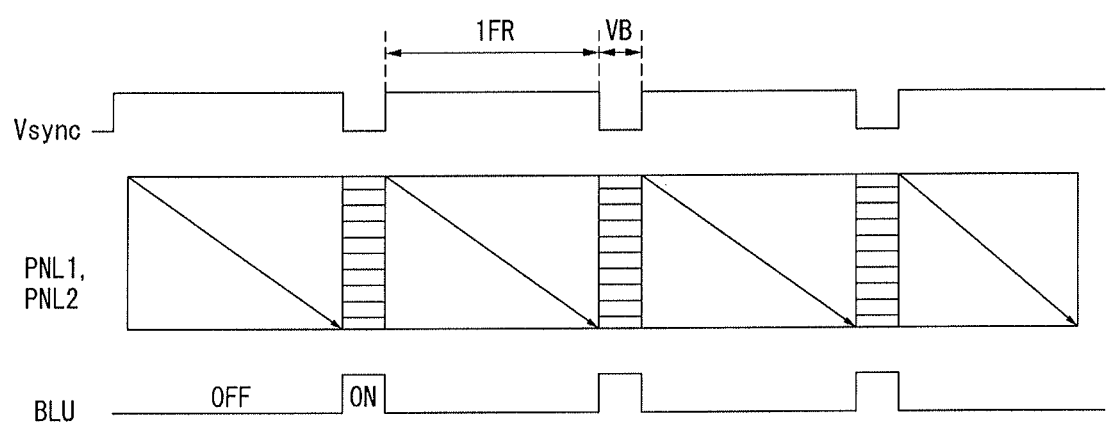
FIG. 10 is a waveform diagram illustrating a backlight driving method, in which light is irradiated onto SLM panels during a vertical blank period.

A transmission type liquid crystal display reproduces an image using light from a backlight unit BLU. If each of the SLM panels PNL1 and PNL2 is implemented as a transmission type liquid crystal display panel, the light from the backlight unit BLU has to be irradiated onto the SLM panels PNL1 and PNL2, so as to reproduce the 3D image. The backlight unit BLU may be implemented as a laser light source LS (refer to FIGS. 11 and 12) generating a laser beam. To improve the quality of the hologram interference fringe image reproduced on the SLM panels PNL1 and PNL2, after data is written to all of the pixels, it is preferable, but not required, that light is irradiated onto the SLM panels PNL1 and PNL2 after the response delay time of all the pixels passed. For this, as shown in FIG. 10, the embodiment of the invention irradiates light onto the SLM panels PNL1 and PNL2 during a vertical blank period VB between the frame periods in which the SLM panels PNL1 and PNL2 are scanned. During the vertical blank period VB, the pixels are held at the data voltage, to which the pixels have been already charged during a previous frame period, without updating new data. In FIG. 10, '1FR' denotes one frame period.

Figure 11:
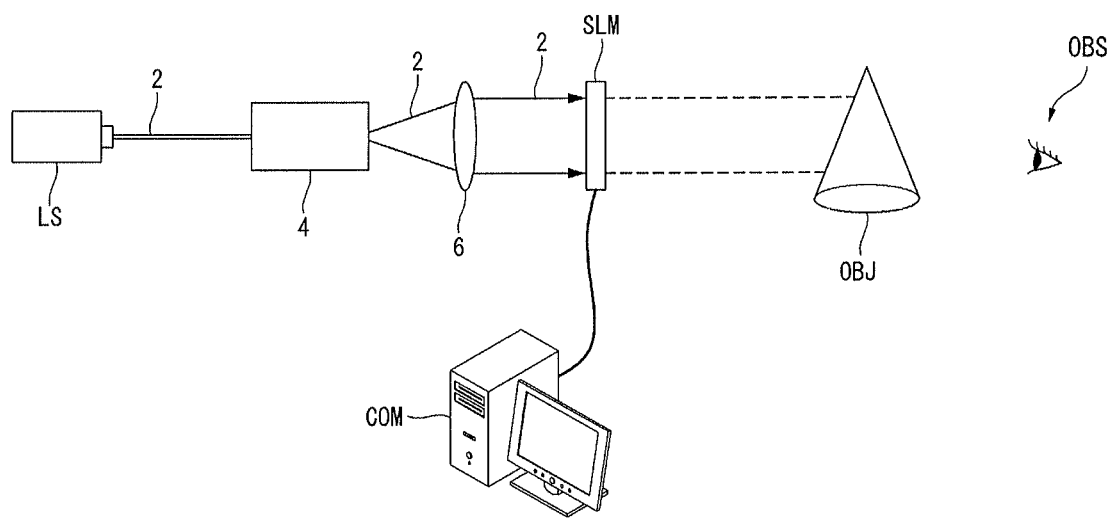
FIGS. 11 and 12 illustrate an example of a computer generated hologram system.
Figure 12:
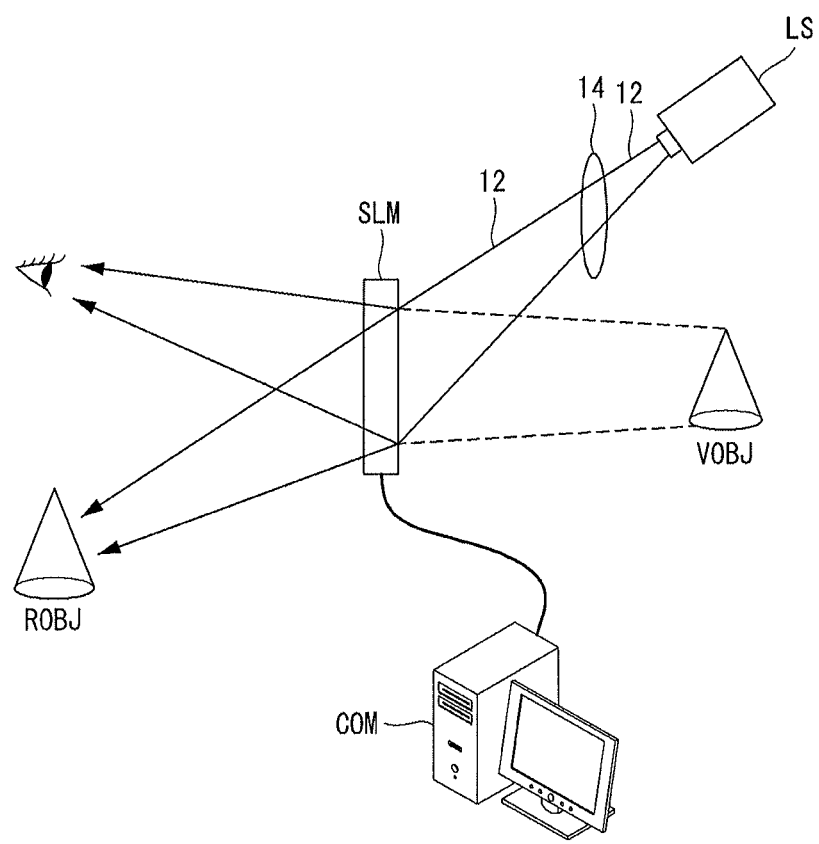

FIGS. 11 and 12 illustrate examples of a method for implementing a computer generated hologram system.

As shown in FIGS. 11 and 12, a computer COM produces the hologram interference fringe image including information of the 3D image. The data of the hologram interference fringe image is transmitted to the SLM panels SLM having the above-described configuration. The SLM panels SLM reproduce the hologram interference fringe image. The laser light source LS (refer to FIG. 10) irradiates a reference beam 2 (12) onto the SLM panels SLM during the vertical blank period VB. The reference beam 2 emitted from the laser light source LS is uniformly irradiated onto the entire display surface of each of the SLM panels SLM through a beam expander 4 and a collimating lens 6 (14). An observer OBS may feel a virtual 3D image OBJ (VOBJ), which is diffracted and reproduced through the hologram interference fringes, with his or her eyes without glasses. In FIG. 12, 'ROBJ' denotes a 3D image reproduced by 0th-order diffracted light passing through the SLM panels SLM, and the 3D image ROBJ is not seen by the observer.

As described above, the embodiment of the invention simultaneously transfers the polarity control signal received from one of the plurality of timing controllers to the plurality of panel driving circuits, thereby synchronizing the polarities of the data voltages written to the same line of the display panels. As a result, the embodiment of the invention may improve the quality of the 3D image reproduced through the hologram interference fringe pattern.

Furthermore, the embodiment of the invention controls the scanning directions of the display panels differently from each other and starts the scanning operation from the pixels positioned around the boundary between the display panels. Hence, the embodiment of the invention may prevent or reduce the loss or the distortion of the image of the middle portion of the hologram interference fringe pattern, in which important informations of the 3D image are concentrated.

Furthermore, the embodiment of the invention irradiates the laser beam onto the display panels after the data of the hologram interference fringe image is written to all of the pixels of the display panels. Hence, the quality of the 3D image may be further improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A digital hologram image reproducing device comprising:
    a light modulator including a plurality of display panels attached to one another on the same plane, the light modulator reproducing a hologram interference fringe image;
    a first panel driving circuit configured to scan a first display panel and write data of the hologram interference fringe image to the first display panel;
    a first timing controller configured to control an operation timing of the first panel driving circuit;
    a second panel driving circuit configured to scan a second display panel and write data of the hologram interference fringe image to the second display panel;
    a second timing controller configured to control an operation timing of the second panel driving circuit; and
    a panel synchronization circuit configured to simultaneously transfer a polarity control signal received from one of the first and second timing controllers to the first and second panel driving circuits.

2. The digital hologram image reproducing device of claim 1, wherein the panel synchronization circuit includes a parallel line, which simultaneously transfers the polarity control signal received from one of the first and second timing controllers to the first and second panel driving circuits.

3. The digital hologram image reproducing device of claim 2, wherein the first panel driving circuit includes:
    a first data driving circuit configured to convert data of a first hologram interference fringe received from the first timing controller into positive and negative analog gamma compensation voltages, generate a first data voltage, supply the first data voltage to data lines of the first display panel, and invert a polarity of the first data voltage in response to the polarity control signal received from the panel synchronization circuit; and
    a first gate driving circuit configured to sequentially supply a first gate pulse to gate lines of the first display panel so that the first gate pulse is synchronized with the first data voltage supplied to the data lines of the first display panel,
    wherein the second panel driving circuit includes:
    a second data driving circuit configured to convert data of a second hologram interference fringe received from the second timing controller into the positive and negative analog gamma compensation voltages, generate a second data voltage, supply the second data voltage to data lines of the second display panel, and invert a polarity of the second data voltage in response to the polarity control signal received from the panel synchronization circuit; and
    a second gate driving circuit configured to sequentially supply a second gate pulse to gate lines of the second display panel so that the second gate pulse is synchronized with the second data voltage supplied to the data lines of the second display panel.

4. The digital hologram image reproducing device of claim 3, wherein the first gate driving circuit shifts the first gate pulse supplied to the gate lines of the first display panel in a first direction in response to a first shift direction signal received from the first timing controller,
    wherein the second gate driving circuit shifts the second gate pulse supplied to the gate lines of the second display panel in a second direction, which is the opposite direction of the first direction, in response to a second shift direction signal received from the second timing controller,
    wherein the first gate pulse is shifted from one edge of the first display panel close to a boundary between the first and second display panels to the other edge of the first display panel,
    wherein the second gate pulse is shifted from one edge of the second display panel close to the boundary between the first and second display panels to the other edge of the second display panel,
    wherein the one edge of the first display panel and the one edge of the second display panel are close to the boundary between the first and second display panels,
    wherein the other edge of the first display panel and the other edge of the second display panel are far away from the boundary between the first and second display panels.

5. The digital hologram image reproducing device of claim 1, wherein a scanning direction of the first display panel and a scanning direction of the second display panel are different from each other, wherein each of a scanning operation of the first display panel and a scanning operation of the second display panel starts from pixels positioned around a boundary between the first and second display panels.

6. The digital hologram image reproducing device of claim 5, wherein the panel synchronization circuit simultaneously transfers a shift direction signal received from one of the first and second timing controllers to the first and second panel driving circuits through a parallel line, wherein the panel synchronization circuit inverts one of the shift direction signal transferred to the first panel driving circuit and the shift direction signal transferred to the second panel driving circuit through an inverter connected to the parallel line, wherein the first panel driving circuit sequentially shifts a gate pulse applied to the gate lines of the first display panel along a scanning direction controlled by the shift direction signal input through the parallel line, wherein the second panel driving circuit sequentially shifts a gate pulse applied to the gate lines of the second display panel along a scanning direction controlled by the shift direction signal input through the parallel line.

7. The digital hologram image reproducing device of claim 6, wherein the first panel driving circuit includes:

a first data driving circuit configured to convert data of a first hologram interference fringe received from the first timing controller into positive and negative analog gamma compensation voltages, generate a first data voltage, supply the first data voltage to data lines of the first display panel, and invert a polarity of the first data voltage in response to the polarity control signal received from the panel synchronization circuit; and a first gate driving circuit configured to sequentially supply a first gate pulse to gate lines of the first display panel so that the first gate pulse is synchronized with the first data voltage supplied to the data lines of the first display panel, wherein the second panel driving circuit includes:

a second data driving circuit configured to convert data of a second hologram interference fringe received from the second timing controller into the positive and negative analog gamma compensation voltages, generate a second data voltage, supply the second data voltage to data lines of the second display panel, and invert a polarity of the second data voltage in response to the polarity control signal received from the panel synchronization circuit; and a second gate driving circuit configured to sequentially supply a second gate pulse to gate lines of the second display panel so that the second gate pulse is synchronized with the second data voltage supplied to the data lines of the second display panel.

8. The digital hologram image reproducing device of claim 7, wherein the first gate driving circuit shifts the first gate pulse supplied to the gate lines of the first display panel in a first direction in response to the shift direction signal received from the panel synchronization circuit, wherein the second gate driving circuit shifts the second gate pulse supplied to the gate lines of the second display panel in a second direction, which is the opposite direction of the first direction, in response to the shift direction signal received from the panel synchronization circuit, wherein the first gate pulse is shifted from one edge of the first display panel close to a boundary between the first and second display panels to the other edge of the first display panel, wherein the second gate pulse is shifted from one edge of the second display panel close to the boundary between the first and second display panels to the other edge of the second display panel, wherein the one edge of the first display panel and the one edge of the second display panel are close to the boundary between the first and second display panels, wherein the other edge of the first display panel and the other edge of the second display panel are far away from the boundary between the first and second display panels.

9. The digital hologram image reproducing device of claim 1, wherein the panel synchronization circuit includes:

a first parallel line configured to simultaneously transfer the polarity control signal received from one of the first and second timing controllers to the first and second panel driving circuits;

a second parallel line configured to simultaneously transfer a shift direction signal received from one of the first and second timing controllers to the first and second panel driving circuits; and an inverter configured to invert one of the shift direction signal transferred to the first panel driving circuit and the shift direction signal transferred to the second panel driving circuit, the inverter being connected to the second parallel line.

10. The digital hologram image reproducing device of claim 9, wherein the first panel driving circuit includes:

a first data driving circuit configured to convert data of a first hologram interference fringe received from the first timing controller into positive and negative analog gamma compensation voltages, generate a first data voltage, supply the first data voltage to data lines of the first display panel, and invert a polarity of the first data voltage in response to the polarity control signal received from the panel synchronization circuit; and a first gate driving circuit configured to sequentially supply a first gate pulse to gate lines of the first display panel so that the first gate pulse is synchronized with the first data voltage supplied to the data lines of the first display panel, wherein the second panel driving circuit includes:

a second data driving circuit configured to convert data of a second hologram interference fringe received from the second timing controller into the positive and negative analog gamma compensation voltages, generate a second data voltage, supply the second data voltage to data lines of the second display panel, and invert a polarity of the second data voltage in response to the polarity control signal received from the panel synchronization circuit; and a second gate driving circuit configured to sequentially supply a second gate pulse to gate lines of the second display panel so that the second gate pulse is synchronized with the second data voltage supplied to the data lines of the second display panel.

11. The digital hologram image reproducing device of claim 10, wherein the first gate driving circuit shifts the first gate pulse supplied to the gate lines of the first display panel in a first direction in response to the shift direction signal received from the panel synchronization circuit, wherein the second gate driving circuit shifts the second gate pulse supplied to the gate lines of the second display panel in a second direction, which is the opposite direction of the first direction, in response to the shift direction signal received from the panel synchronization circuit, wherein the first gate pulse is shifted from one edge of the first display panel close to a boundary between the first and second display panels to the other edge of the first display panel, wherein the second gate pulse is shifted from one edge of the second display panel close to the boundary between the first and second display panels to the other edge of the second display panel, wherein the one edge of the first display panel and the one edge of the second display panel are close to the boundary between the first and second display panels, wherein the other edge of the first display panel and the other edge of the second display panel are far away from the boundary between the first and second display panels.

12. The digital hologram image reproducing device of claim 1, further comprising a light source configured to irradiate light onto the light modulator only during a vertical blank period.

13. A synchronization control method of a digital hologram image reproducing device including a light modulator which includes a plurality of display panels attached to one another on the same plane and reproduces a hologram interference fringe image, the control method synchronization comprising:

scanning a first display panel and data of the hologram interference fringe image to the first display panel with a first panel driving circuit;

controlling an operation timing of the first panel driving circuit with a first timing controller;

scanning a second display panel and writing data of the hologram interference fringe image to the second display panel with a second panel driving circuit;

controlling an operation timing of the second panel driving circuit with a second timing controller:

generating a first polarity control signal from the first timing controller;

generating a second polarity control signal from the second timing controller; and simultaneously transferring one of the first and second polarity control signals to a first panel driving circuit and a second panel driving circuit.

14. The synchronization control method of claim 13, wherein the simultaneously transferring of one of the first and second polarity control signals to the first and second panel driving circuits includes simultaneously transferring one of the first and second polarity control signals to the first and second panel driving circuits through a parallel line connected between one of the first and second timing controllers and the first and second panel driving circuit.

15. The synchronization control method of claim 13, wherein a scanning direction of the first display panel and a scanning direction of the second display panel are different from each other, wherein each of a scanning operation of the first display panel and a scanning operation of the second display panel starts from pixels positioned around a boundary between the first and second display panels.

16. The synchronization control method of claim 15, further comprising:

generating a first shift direction signal from the first timing controller;

generating a second shift direction signal from the second timing controller;

simultaneously transferring one of the first and second shift direction signals to the first and second panel driving circuits through a parallel line;

inverting one of the shift direction signal transferred to the first panel driving circuit and the shift direction signal transferred to the second panel driving circuit through an inverter connected to the parallel line;

sequentially shifting a gate pulse applied to gate lines of the first display panel along a scanning direction controlled by the shift direction signal input through the parallel line using the first panel driving circuit; and sequentially shifting a gate pulse applied to gate lines of the second display panel along a scanning direction controlled by the shift direction signal input through the parallel line using the second panel driving circuit.

17. The synchronization control method of claim 13, further comprising irradiating light onto the light modulator only during a vertical blank period.

* * * * *